INVENTOR
SHIGERU MIYAMICHI

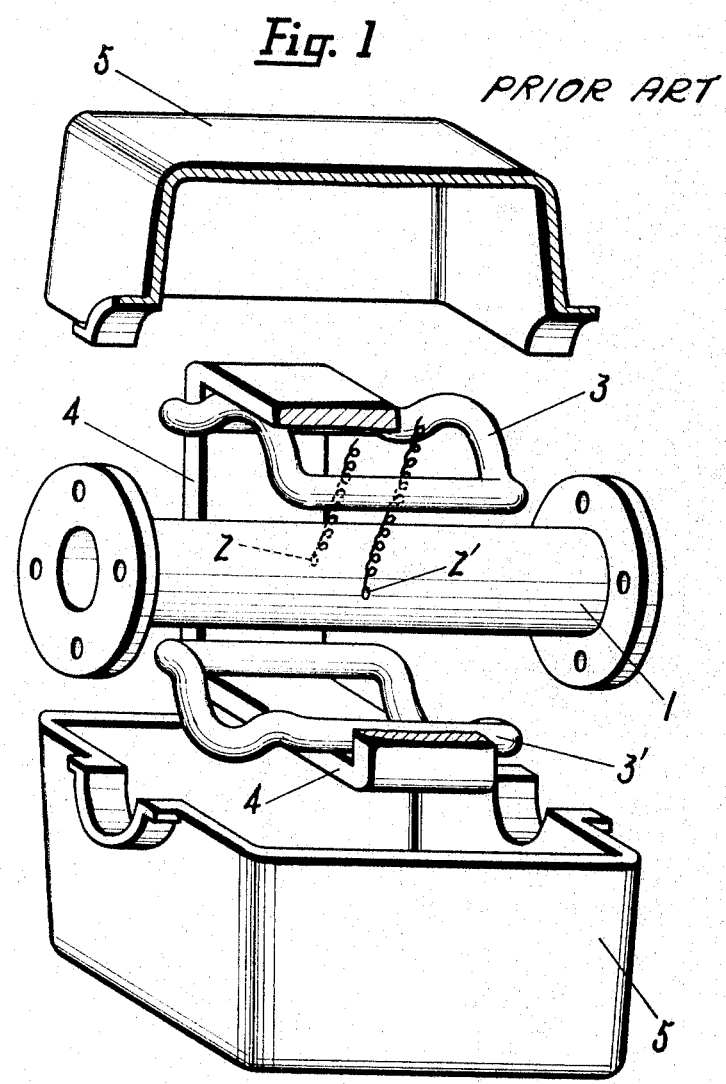

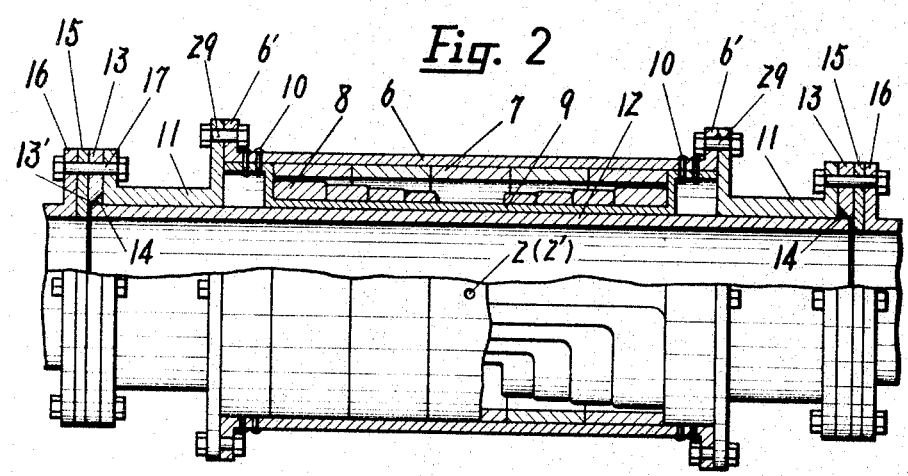
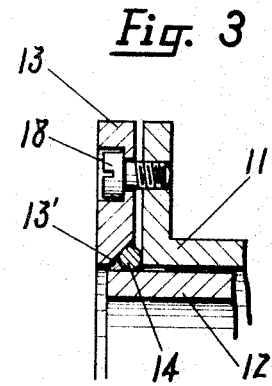
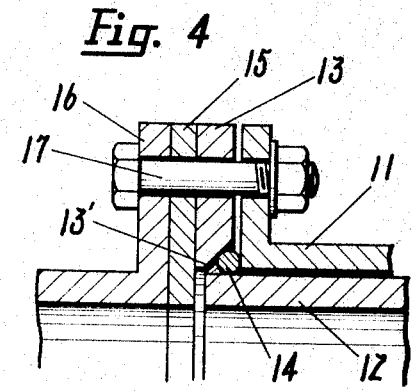

United States Patent Office 3,334,518
Patented Aug. 8, 1967

3,334,518
TRANSMITTER FOR AN ELECTROMAGNETIC FLOWMETER
Shigeru Miyamichi, Yokohama, Japan, assignor to Hokushin Electric Works Limited, Tokyo, Japan, a corporation of Japan
Filed Sept. 25, 1964, Ser. No. 399,182
Claims priority, application Japan, Sept. 30, 1963, 38/51,683
2 Claims. (Cl. 73—194)

This invention relates to transmitters for electromagnetic flowmeters.

The transmitter for an electromagnetic flowmeter according to the present invention comprises a housing member in which an iron core and exciting coils are arranged inside a metallic cylindrical case so as to have a hollow part concentric with said case and are formed integrally with the case and a flange for connecting a piping is fixed to each end of the case and a conduit pipe member formed separately from said housing member has a pair of electrodes, is inserted into said hollow part and is secured at both ends of said housing member.

An object of the present invention is to provide a transmitter for an electromagnetic flowmeter wherein a conduit pipe through which a liquid to be measured is to pass is detachably fitted so as to be replaceable.

Another object of the present invention is to connect the piping of the plant to the case so that various stresses from the piping may be borne by the case and the conduit pipe may be protected.

A further object of the present invention is to make it possible to use pipes of any material or specifically a synthetic resin.

In the accompanying drawings.

FIGURE 1 is a perspective view of a known conventional transmitter as disassembled:

FIGURE 2 is a partly vertically sectional view of a transmitter according to the present invention;

FIGURES 3 and 4 are magnified sectional views of flange parts of joint pipes and pipings;

Figure 5:
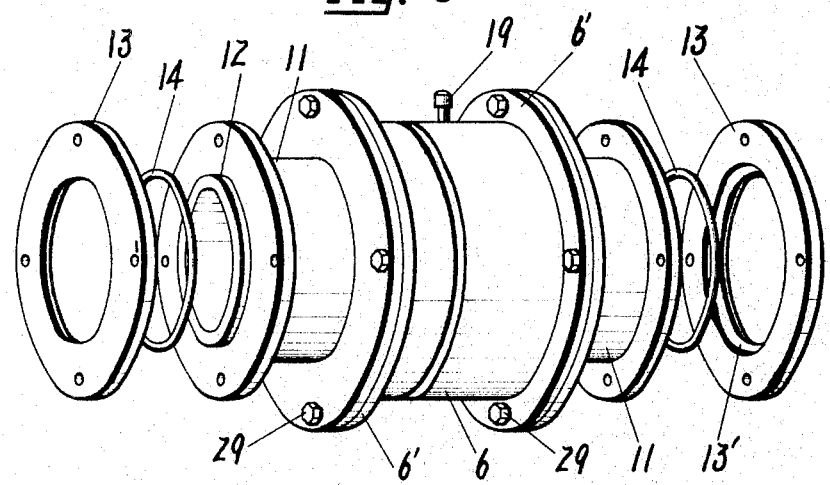
FIGURE 5 is a perspective view of the appearance of transmitter according to the present invention as disassembled.

The present invention shall be detailed with reference to the accompanying drawings.

A conventional transmitter for an electromagnetic flowmeter, as illustrated in FIGURE 1, comprises a pair of electrodes 2 and 2' fitted to a metallic nonmagnetic conduit pipe 1 having an inside surface of an insulator and having flanges for connecting pipings so that the straight line connecting both electrodes 2 and 2' and the center line of the metallic conduit pipe 1 may intersect at right angles with each other, exciting coils 3, 3' to give an alternating magnetic field in a direction at right angles to both electrodes 2 and 2', an iron core 4 forming a magnetic circuit for said coils 3, 3' and a case 5 enclosing them. However, the conventional transmitter in the above mentioned formation has various defects enumerated below:

(1) As the conduit pipe 1 is a central structure for the transmitter, the total weight of the transmitter will rest on the conduit pipe 1. Further, in case the conduit pipe 1 is fitted to the piping of the plant, not only the pressure of the liquid to be measured but also various stresses caused by the piping will act on the conduit pipe. Therefore a conduit pipe of a very high mechanical strength is required.

(2) The conduit pipe requires such conditions that not only (a) its mechanical strength should be high as mentioned above but also (b) it should be of a nonmagnetic material, (c) should be of a specific conductivity as low as possible and (d) should be comparatively easy to acquire. Therefore, stainless steel has been considered to be most suitable for the material of the conduit pipe but is not only rather costly but also must be coated on the inside surface of the pipe with such insulator as a synthetic resin or glass so as to insulate the inside surface from the liquid to be measured.

(3) Statistically almost all of the troubles in the transmitter for the electromagnetic flowmeter occur in the part in contact with the liquid.

It is considered in the principle that the troubles are caused only by the deterioration, ageing and wear of the insulator with which is coated the inside surface of the conduit pipe due to the corrosiveness, wearing property and temperature variation of the liquid to be measured in the electromagnetic flowmeter transmitter having no moving part. Therefore, if a conduit pipe made of stainless steel is used as mentioned above, the thin insulator with which the inside surface is coated will be soon deteriorated, aged and worn. Further, once a trouble occurs, the conduit pipe will have to be replaced and not only the case 5 but also the exciting coils 3, 3' and the iron core 4 will have to be all disassembled and reset.

Even if they are reset, the exciting coils 3, 3' and the iron core 4 will not be always in the same relative position with the new conduit pipe but the output part of the reset transmitter will be more or less different from before it was disassembled and will have to be recalibrated. That is to say, it is impossible in most cases to repair the transmitter on the working spot.

(4) In producing electromagnetic flowmeter transmitters, the materials are arranged according to expected orders. However, unless the liquid to be measured is determined, the insulator with which the inside surface of the metallic conduit pipe is to be coated will not be able to be determined, because a proper insulating material must be selected according to the corrosiveness, wearing property and temperature variation of the liquid to be measured. That is to say, as the material will not be able to be arranged unless it is determined, the anticipated production of such transmitters is considerably difficult.

The present invention solves the problems mentioned above and provides low cost ideal transmitters for electromagnetic flowmeters.

Illustrated in FIGURE 2 is an embodiment of the present invention. In FIGURE 2, 6 is a metallic cylindrical case for a transmitter provided with a flange 6' for connecting a piping at each end and having an annular iron core 7 fitted closely to the inside. 9 is a coil fitting plate which is cylindrical on the inside surface, is fitted with an exciting coil 8 on the outside surface and is fixed with screws 10 from inside the case 6. That is to say, the iron core 7 and the exciting coil 8 are arranged inside the metallic cylindrical case 6 so as to have a hollow part concentric with said case and are formed integrally with the case so as to make a housing member. 11 is a joint pipe for connecting a plant piping and secured with bolts 29 to the flange 6' provided at each end of the case 6. 12 is a conduit pipe member through which a liquid to be measured is to pass and which is formed separately from the housing member, is provided with a pair of electrodes 2 and 2' and their lead wires in the middle and is detachably inserted in the hollow part of the housing member through the joint pipes 11. For the above mentioned conduit pipe member 12 is used not only a stainless steel pipe coated on the inside surface with an insulator but also a pipe made of any of various synthetic resins and insulators which have been recently developed remarkably and are ideal for conduit pipes for transmitters. 13 is a pressing plate having a groove 13', fastened and fixed to the joint pipe 11 with bolts 18 as illustrated in FIGURE 3 and at the same time secured by fastening the conduit pipe part 12 to the above mentioned housing member through the joint pipe 11 by an O-ring 14 inserted in the groove 13' so that the liquid to be measured may be prevented from entering the housing member. 16 is a plant piping fixed to the joint pipe 11 with bolts 17 through a packing 15 and the pressing plate 13 as illustrated in FIGURE 4. In case the conduit pipe member is made of an insulator, its electrostatic shield will be required. But, when the above mentioned coil fitting plate 9 is connected to an earthing terminal, the conduit pipe member 12 will be able to be perfectly electrostatically shielded.

The process of assembling the transmitter of the above mentioned formation shall be explained with reference to FIGURE 5. First of all, the joint pipe 11 is secured with the bolts to the flange 6' at each end of the case 6 in the housing member. Then the conduit pipe member 12 is inserted into the hollow part through the joint pipe 11 so that the three of the center lines of the conduit pipe member 12, the line connecting the electrodes 2 and 2' and the magnetic field by the exciting coil 8 may intersect at right angles with one another. Thereafter, the O-ring 14 is inserted. The pressing plate 13 is connected to the joint pipe 11 with the bolts 18 so that the conduit pipe member 12 may be perfectly fixed to the housing member and the transmitter may be completed. The lead wires of the electrodes 2 and 2' may be led to a terminal case 19 by inserting a tool for pulling out the lead wires through the terminal case 19 in advance and may be screwed.

According to the formation of the transmitter of the present invention as in the above, the above mentioned various problems can be solved and there are such advantages as are enumerated below:

(1) In the transmitter according to the present invention, as various stresses by such vibration, heat and shock as are caused by the piping 16 of the plant are transmitted to the case 6 through the packing 15, pressing plate 13 and joint pipe 11, the conduit pipe member 12 will not be substantially subjected to such stresses but will be subjected only to the weight of the liquid to be measured in the conduit pipe part and the pressure of said liquid. Therefore, it is not necessary to use such costly metallic conduit pipe as of stainless steel for the conduit pipe member 12. Such insulative conduit pipe as, for example, of a synthetic resin or any other material of a mechanical strength lower than of a metal can be always used. Therefore, marketed conduit pipes made of any of low cost synthetic resin materials which are higher in anticorrosion and wear-resistance than metals and are comparatively easy to acquire can be used today.

Figure 6:
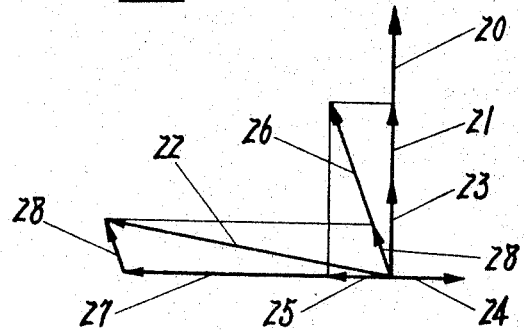
FIGURE 6 is an explanatory diagram of electric elements produced in the transmitter.

In the transmitter, an insulative conduit pipe is desirable in the principle, because, if a metallic conduit pipe is used for the conduit pipe member and an alternating magnetic field is given by the exciting coil an eddy current will be generated in the conduit pipe member and, in the case of excitation with the alternating magnetic field, the phase relation of the electric elements including the above mentioned eddy current in the transmitter will be as shown in FIGURE 6. 20 is a magnetic field intensity by the exciting coil 8. 21 is an exciting current intensity to generate said magnetic field intensity. 22 is a voltage of the exciting current source. 23 is a signal voltage generated in both electrodes 2 and 2'. 24 is the intensity of an eddy current flowing through the conduit pipe member. 25 is the intensity of a current flowing through the exciting coil to cancel the magnetic field generated due to the eddy current. 26 is the intensity of a total current flowing through the exciting coil. 27 is an electromotive force generated in the exciting coil by the variation of the magnetic field. 28 is a resistance voltage drop of the exciting coil. That is to say, by the current 25 to cancel the magnetic field generated due to the eddy current 24, the phase of the total current 26 flowing through the exciting current will be varied. Now for example, if the temperature and temperature distribution in the conduit pipe member vary with the temperature of the liquid to be measured, as the specific conductivity of the conduit pipe member depends on the temperature, the resistance and resistance distribution in the conduit pipe member will vary. This resistance variation in the conduit pipe part will appear as a variation of the eddy current 24 in FIGURE 6 and will further become a variation of the total current 26 flowing through the exciting coil. That is to say, in the electromagnetic flowmeter transmitter, it is the most precise measuring method to measure the volume of flow by comparing the voltage proportional to the exciting current 20 and the signal voltage 23 with each other. However, in fact, the ratio to the voltage proportional to the total current 26, that is, to the comparison voltage is measured. As the comparison current varies with the variation of the total current 26 flowing through the above mentioned exciting coil, the ratio to the signal voltage 23 being measured will also vary and will cause an error. On the other hand, as the variation of the resistance distribution in the conduit pipe member varies the eddy current distribution, the distribution of the secondary magnetic field by the eddy current will vary, the electromagnetic induction voltage to the electrodes and the lead wires coming out of them will vary and a large noise current will be caused.

Thus, the metallic conduit pipe has electric problems and must be made of a material of a specific conductivity as low as possible. But, the conduit pipe made of an insulator requires no such consideration at all.

As in the above, according to the present invention, not only the above described required conditions (a), (b), (c) and (d) as of a conventional conduit pipe material but also such conditions that (e) the material should be high in anticorrosion, (f) should be an insulator, (g) should be high in wear-resistance and (h) should be high in heatproofness can be met and the most ideal transmitter can be formed.

(2) It has been already described that the part to be consumed in the electromagnetic flowmeter transmitter is only the part in contact with the liquid. In the present invention, it is the greatest feature that the conduit pipe member in conact with the liquid can be freely replaced on the working spot as required. It should be added that the error in the case of replacement need not be taken into consideration. That is to say, the signal voltage generated between the electrodes 2 and 2' is theoretically determined by the following formula:

$$eB \cdot D \cdot \overline{V} \qquad (1)$$

wherein B is the magnetic field intensity, D is a distance between electrodes 2 and 2' and $\overline{V}$ is a mean velocity of flow.

However, in the present invention, as only the conduit pipe member can be replaced without touching the housing member, the magnetic field distribution in the conduit pipe member will remain as it is. Only the inside diameter D of the conduit pipe member being replaced is considered to have a replacement error.

However, it is so easy to work the conduit pipe member with an allowance of less than 0.1% in the working dimension that the replacement error need not be taken into consideration at all. Therefore, even if the conduit pipe memeber is replaced on the working spot, the precision will be able to be secured without recalibration.

Thus, the transmitter of the present invention can be used forever by maintaining a fixed maintenance method, in fact, substantially withou taking the life into consideration. This is a very great advantage to a transmitter operating as a nervous system of a gigantic plant, because, in the conventional transmitter, the break of the insulator with which the inside surface of the conduit pipe is coated is so fatal to the transmitter that the conduit pipe member must be sent back to the manufacturer to be overhauled, relined with the insulator, reinspected and then must be sent again to the working spot while the operation of the plant is blind or supply parts must be prepared for such time.

(3) The electromagnetic flowmeter transmitter is to be used for so many purposed that, in the conventional one, before the assembly, the coating material for the conduit pipe must be selected by the nature of the object to be measured but, in the transmitter according to the present invention, as it does not depend on the object to be measured, completed units of the housing members and conduit pipe member can be stocked. Therefore, the conduit pipe members for various objects can be prepared so that, as soon as the object to be measured is determined, the proper conduit pipe member may be fitted to complete the transmitter. That is to say, the minimum number of the products that can be applied to any specification of the liquid to be measured can be prepared uniformly, the arrangements of the members can be simplified, the transmitters can be stored in a nearly completed state and the products can be delivered earlier. Therefore, even if the specification of the liquid to be measured is changed during the production, the products will be able to be easily made to conform to the change. Even in case a different liquid to be measured is to made to flow on the working spot, only a required conduit pipe member will have to be sent to the spot.

(4) The ratio of the cost of the conduit pipe member to that of the entire transmitter is the largest in the conventional one. That is to say, such metallic conduit pipe as of stainless steel coated inside with an insulator is very costly. The cost of the generally marketed synthetic resin conduit pipe used in the present transmitter will be 5 to 15% when high and 1 to 3% when low to that of the conventional metallic conduit pipe. Thus, the cost of the entire transmitter can be made very low.

What is claimed is:

1. A transmitter for an electromagnetic flowmeter comprising a metallic cylindrical case having a flange at each end, a coil fitting plate secured to the interior of said case and defining a hollow cylindrical interior and a chamber between said plate and said case, an iron core and an exciting coil disposed in said chamber, and a cylindrical conduit pipe member formed separately from said housing member arranged within said hollow cylindrical interior of said fitting plate and having a pair of electrodes, and means at both ends of said case and connected to a respective flange of said case for holding said conduit pipe member in position and for connecting piping to said case.

2. A transmitter according to claim 1, wherein said means at both ends of said case for holding said conduit pipe member in position and for connecting piping to said case includes a joint pipe connected to the flange at each end of said case, an O-ring positioned over said conduit pipe member, and a pressing plate secured to said joint pipe and fixing said O-ring over said conduit pipe member and preventing liquid from entering said chamber.

References Cited

UNITED STATES PATENTS 3,018,799   1/1962   Volkmann et al. __ 73—213 XR

FOREIGN PATENTS 1,342,211   9/1963   France.

RICHARD C. QUEISSER, Primary Examiner.

C. A. RUEHL, Assistant Examiner.